United States Patent [19]

Zarate

[11] Patent Number: 4,694,890
[45] Date of Patent: Sep. 22, 1987

[54] ANALOG COMPUTER VARIABLE DUTY MODULATOR

[75] Inventor: Humberto T. Zarate, Houston, Tex.

[73] Assignee: Dianalog Systems, Inc., Houston, Tex.

[21] Appl. No.: 723,433

[22] Filed: Apr. 15, 1985

[51] Int. Cl.[4] .................. F28F 27/00; G05D 23/00
[52] U.S. Cl. ........................................ 165/12; 165/26; 165/29; 236/46 F; 236/11; 62/231
[58] Field of Search .............. 165/12, 26, 27, 29; 236/46 R, 46 F, 10, 11; 62/231

[56] References Cited

U.S. PATENT DOCUMENTS

| | | | |
|---|---|---|---|
| 3,616,846 | 11/1971 | Wills | 165/26 |
| 3,768,545 | 10/1973 | Wills | 165/27 |
| 3,964,677 | 6/1976 | Schalow et al. | 165/12 |
| 4,199,023 | 4/1980 | Phillips | 165/26 |
| 4,288,854 | 9/1981 | Burroughs | 165/26 |
| 4,292,813 | 10/1981 | Paddock | 165/12 |
| 4,313,308 | 2/1982 | Boratgis et al. | 165/26 |
| 4,333,519 | 6/1982 | Shafrir et al. | 165/12 |
| 4,369,916 | 1/1983 | Abbey | 236/11 |
| 4,384,461 | 5/1983 | Kurtz | 62/231 |
| 4,423,765 | 1/1984 | Hildebrand | 236/46 R |
| 4,509,585 | 4/1985 | Carney et al. | 236/46 R |
| 4,559,789 | 12/1985 | Rick | 236/46 F |

FOREIGN PATENT DOCUMENTS

| | | | |
|---|---|---|---|
| 2724878 | 12/1978 | Fed. Rep. of Germany | 165/12 |
| 2329012 | 5/1977 | France | 236/46 F |
| 0066720 | 4/1984 | Japan | 236/46 F |
| 0066721 | 4/1984 | Japan | 236/46 F |
| 0830345 | 5/1981 | U.S.S.R. | 236/46 F |

Primary Examiner—Albert W. Davis, Jr.
Assistant Examiner—John K. Ford
Attorney, Agent, or Firm—Jim L. De Cesare

[57] ABSTRACT

A control system for heating and cooling devices is disclosed which increase the total running time for the heating and cooling devices as the ambient temperature sensed deviates from the set-point temperature. Five states of ON-time modulation of 2, 5, 10, 15 and 20 minutes are preferred in response to this deviation. Constant periods of OFF-time of 2 or 5 minutes occur after each period of ON-time. Within a small deviation of the ambient temperature around the set-point temperature no conditioning equipment is operated. Beyond a large deviation, the respective heating or cooling equipment is operated continuously. A manual override is disclosed, and the system is manually switched from a heating to a cooling mode. A fan control line switches on whenever a heating or cooling device is actuated and the control system can be used with a heat pump.

5 Claims, 5 Drawing Figures

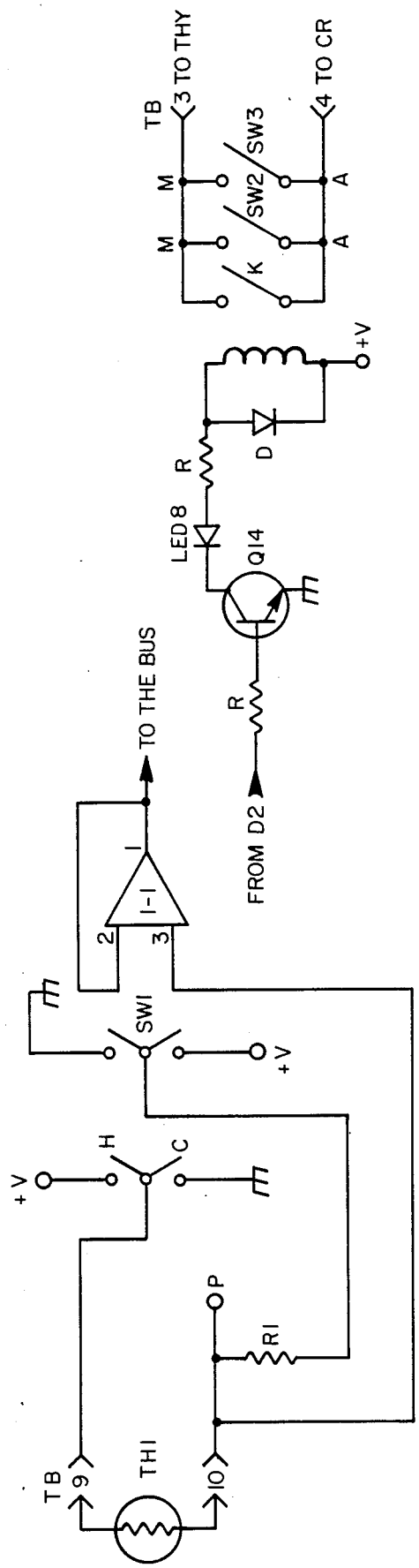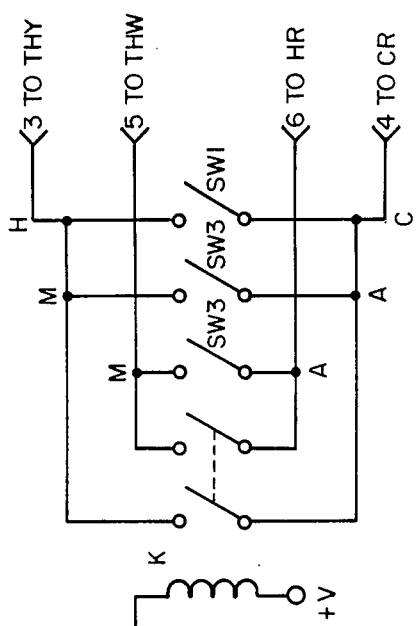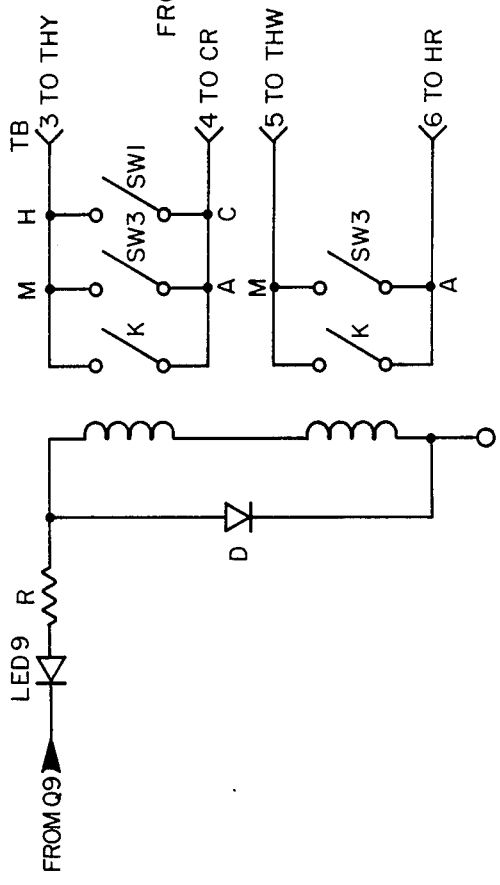
FIG. 2  FIG. 3  FIG. 4  FIG. 5

4,694,890

ANALOG COMPUTER VARIABLE DUTY MODULATOR

BACKGROUND OF THE INVENTION

The present invention relates to an analog computer variable duty modulator used in an air conditioning and heating system in a controlled area wherein the compressor off time in a cycle is fixed and the operating time of the compressor is adjusted automatically in response to the difference between the ambient temperature and selected ON and OFF temperatures.

Controls, such as thermostats and timers, for air conditioning and heating systems are widely used in residential and commercial applications. Thermostats work on a single function based on temperature. Timers work on a single function based on time. For both thermostats and timers the equipment is either on or off. The thermostat works on the basis of temperature sensing. The on and off time of the compressor is random and is subject to a range of temperature variations. The timer works on the basis of a fixed total period of time, i.e., the ON and OFF time functions in such a way that the addition of the two equals a constant time period. This procedure can control the temperature but with relatively high peaks and valleys when compared to the thermostat. In the cooling mode, for both types of controls, when the OFF time is excessively long, on the order of 10 to 15 minutes, the temperature rises and the relative humidity increases. When the compressor starts, it must run longer because it needs to condense the moisture first before room temperature is lowered. The present invention reduces the negative feature of relative humidity build up and creates the opportunity for energy savings.

Some thermostats and timers are controlled by microprocessor based digital circuitry. They are subject to strong electromagnetic interference generated by seasonal electrical storms or incoming noise via the power lines or the outgoing lines that connect the cycler to the controlled devices. This causes memory loss, false processing of transients and distorted programs. All of this provokes the failure of the cycler, in most cases producing permanent damage to the delicate CMOS chips. The present invention of analogic nature makes it completely noise immune.

None of the commercial cyclers analyzed has the provision, in the case of failure, that allows the user to return to the original thermostat or manual operation of the air conditioning and heating equipment without making changes in the wiring or calling for a trained technician.

Controlled residential devices studied lack the multifeatured capability of being used on commercial equipment over 5 tons, on heat pumps without additional wiring, programmed fan delay, a remote sensor location and an auxiliary output for control of secondary equipment.

SUMMARY OF THE INVENTION

The present invention is an analog computer variable duty modulator to be used in conjunction with a temperature control device in an air conditioning and heating system within a controlled area to improve the overall efficiency of the system. The present invention utilizes an ambient temperature sensor, such as a thermistor, either on board or at a remote location, a precision resistor and a regulated direct current power supply to create a varying, quasi linear voltage with a predictable voltage to temperature relationship. The voltage is processed in two different methods by the signal conditioner circuitry according to the setting of the MODE switch, to either Heat or Cool.

The buffered output of the signal conditioner is coupled to the input bus of the timer and override circuitry. This circuitry includes a voltage divider resistor network that divides by five (5) the difference between the selected ON and OFF temperatures, converted to voltages. The OFF voltage plus one-fifth of the differential voltage, described above, is applied as a voltage reference sequentially to each of five comparators. The input bus signal voltage is compared to the reference voltage on each comparator. The comparator output swings high or low according to the differential voltage and the connection configuration. Buffered signal voltages that are outside of the OFF and ON voltage span create an override OFF or override ON condition. Light emitting diodes (LED's) are used to identify readily the states of control, override ON and OFF and each of the five stages of modulation. The user is advised that more energy is being used as each additional LED glows.

Transistors in a Darlington configuration are used to minimize that total base current from the timing capacitor, so that the calculated constant time for each stage of modulation is not distorted. When a Darlington is activated it shorts part of the timing resistor network, changing sequentially, the constant time of the Resistor Capacitor (RC) circuit. This constant time is processed through an Integrated Circuit (IC) timer and transistor circuit which controls the ON time of the heater, compressor and fan. LED's identify individually when heater, compressor and fan are ON.

When the buffered conditioned signal voltage goes higher than the reference voltage on the OFF comparator, the transistor in the output circuit goes off and blocks operation of the heating ventilating, air conditioning (HVAC) equipment and a LED indicates override OFF. When the buffered conditioned signal voltage goes lower than the reference voltage on the ON comparator, the transisitor in the output circuit goes on and HVAC equipment operates continuously. An integrator circuit in the output of the OFF and ON comparators prevents false triggering of the on and off transistors.

The timing circuit is designed to provide a constant off time for every stage of modulation. The off time is longer for the cooling mode than for the heating mode.

A fail-safe feature is provided by the manual (M)-automatic (A) switch. If a malfunction is suspect, selection of the manual mode, which returns control to the thermostat, will identify whether the present invention is at fault.

Other features of the invention will be apparent from the following description and from the drawings. While illustrative embodiments of the invention are shown in the drawings and will be described in detail herein, the invention is susceptible of embodiment in may forms and it should be understood that the present disclosure is to be considered as an exemplification of the principles of the invention and it is not intended to limit the invention to the embodiment illustrated.

BRIEF DESCRIPTION OF DRAWINGS

FIG. 2 is a schematic diagram of the circuitry for an optional temperature sensor and signal condition.

FIG. 3 is a schematic diagram of the circuitry for an optional fan control.

FIG. 4 is a schematic diagram of the circuitry for an optional heater and cooling relay control.

FIG. 5 is a schematic diagram of the circuitry for an optional heater and cooling relay control.

DETAILED DESCRIPTION OF THE PREFERRED EMBODIMENT

Figure 1:
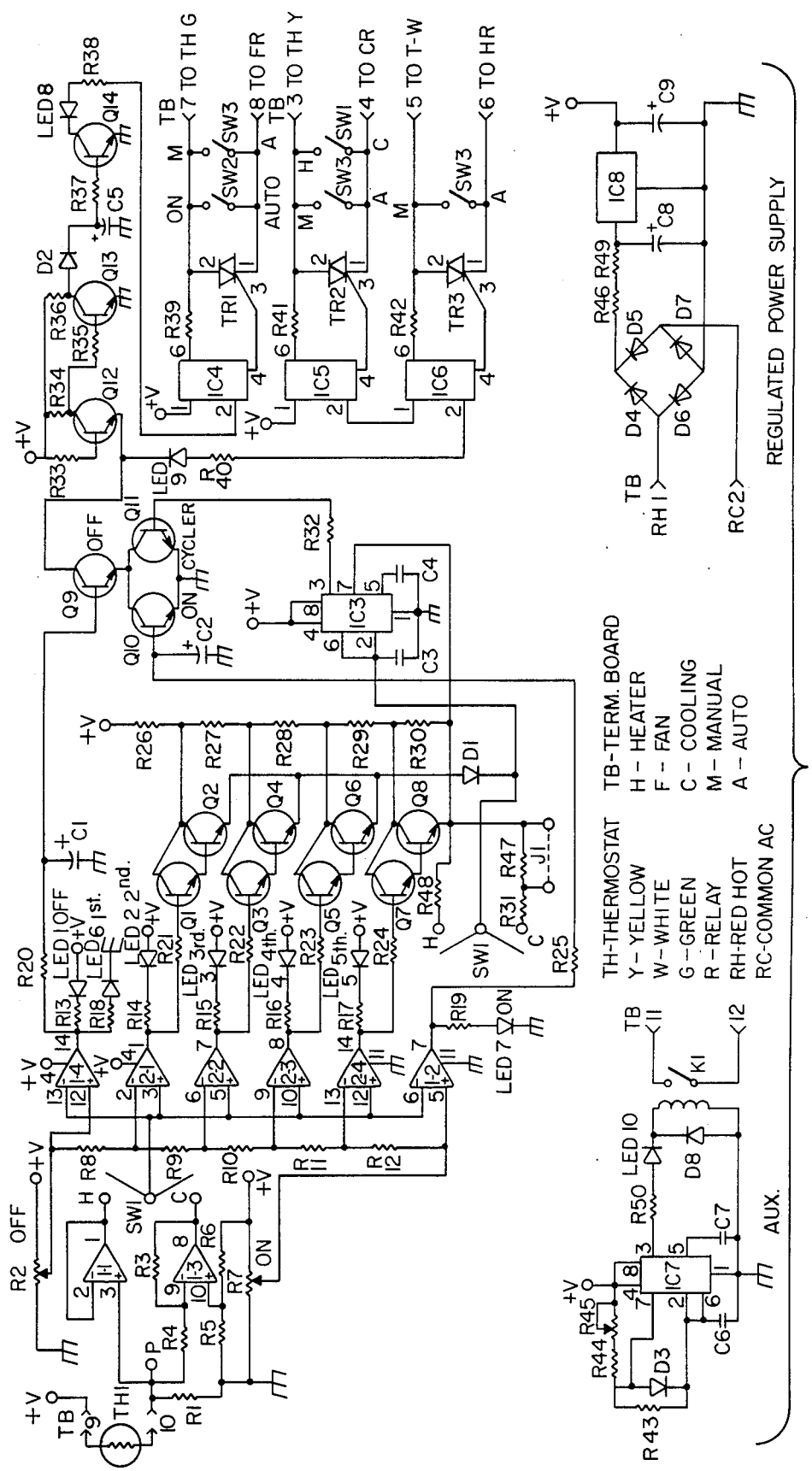
FIG. 1 is a schematic diagram of the complete circuitry of the preferred embodiment including auxiliary (AUX) output circuit and REGULATED POWER SUPPLY CIRCUIT.

FIG. 1 shows that the present invention, the analog computer variable duty modulator, is connected to a thermostat through a terminal board, positions 3, 4, 5, 6, 7 and 8 by an external multi-conductor line. Additionally, the regulated power supply is connected to a 24 volt a.c. controlled transformer through the same terminal board, positions 1 and 2 by an external multi-conductor line.

In FIG. 1, the ambient temperature is sensed by thermistor TH1. Thermister, TH1, is connected to positions 9 and 10 on the terminal board. TH1 can be installed on board or it can be placed, for optimum temperature sensing effect, up to 1,000 feet away connected with a pair of non-polarizing wires. TH1 was selected to provide a quasi linear voltage in the temperature range of 60° F. to 90° F. The thermistor TH1 and resistor R1 are connected as a voltage divider between the full voltage of the regulated power supply and ground. The resistance value of R1 was selected to provide a predetermined signal voltage at a 75° F. ambient temperature at point P. This signal voltage is applied to operational amplifiers IC1-1 (1-1) and IC1-3 (1-3). (1-1) is connected in a non-inverting configuration as a voltage follower, and (1-3) is connected in an inverting configuration with unity gain.

Resistors R5 and R6 were selected to provide from their junction, when placed in series across the regulated power supply, a signal of the same voltage at point P when the ambient temperature is 75° F. This signal is a reference voltage at pin 10 of (1-3).

Potentiometers R2 and R7 are connected across the regulated power supply and ground. The wiper arm of R2 gives the reference voltage for the OFF temperature and the wiper arm of R7 gives the reference voltage for the ON temperature. These two reference voltages from R2 and R7 establish a voltage span and are applied to the series resistor network, formed by R8, R9, R10, R11 and R12, at the end of R8 and R12 respectively. The voltages from R2 and R7, regardless of their setting, applied to R8 and R12 are divided by five by the series resistor network. Each one fifth of the total voltage span represents one stage of modulation. For example, if the voltage span from R2 to R7 is 5 volts, representing the difference in ON and OFF temperatures shown on the ON and OFF selector readings, each stage of modulation will represent a one fifth of 5 volts or 1 volt change across each resistor in the series resistor network.

Pin 1 of (1-1) is connected to position H of switch SW1 and pin 8 of (1-3) to position C of switch SW1. SW1 is the mode switch and is a four pole double throw switch. One common terminal of SW1 forms the bus to which are connected pin 13 and pin 6 of inverting comparators IC1-4 (1-4) and IC1-2 (1-2) and pin 3, pin 5, pin 10 and pin 12 of non inverting comparators: IC-1 (2-1), IC-2 (2-2), IC 2-3 (2-3) and IC-4 (2-4).

The output of the six comparators are coupled to transistors; four of the comparators are coupled to transistors in a Darlington configuration.

Five resistors R26 through R30 form the ON timing resistor network of Timer IC3. The five ON time modulation stages in the preferred embodiment are 2, 5, 10, 15 and 20 minutes. R48 is the OFF time resistor in the heating mode and R31 is the OFF time resistor in the cooling mode for timer IC3. In the preferred embodiment OFF time is 2 minutes and 5 minutes for Heating and Cooling modes respectively.

In the heating mode, the OFF and the ON setting of R2 and R7 respectively, set six different reference voltages across R8 and R12.

When the sensed temperature is higher than the temperature setting of the OFF potentiometer, the voltage of pin P is buffered through operational amplifiers (1-1) and output on pin 1 is applied through H on SW1 to the bus. Pin 13 of comparator (1-4) connected to the bus, will be higher than pin 12 of comparator (1-4). Output pin 14 of (1-4) will be low, OFF light omitting diode LED1 will glow indicating that the system is in override OFF. Transistor Q9 and Q12 go off. Transistor Q13 conducts to saturation and transistor Q14 shuts off: (a) input LED8 in collector circuit of Q14, and (b) optoisolator triac driver IC4 causing gate of triac TR1, with no bias, to shut off the coil of fan relay connected to position 8 on the terminal board. Position 7 on the terminal board is connected to THG (fan in the thermostat).

Concurrently, when Q9 goes off, it stops conduction of LED9 which goes off indicating that heating, ventilating and air conditioning (HVAC) equipment is off. Input LED9 in collector circuit of Q9 shuts off optoisolators IC6 and IC5 letting gates of triacs TR2 and TR3, with no signal, shut off the coil of the external heater relay.

Concurrently, the bus presents a higher voltage to comparators (2-1), (2-2), (2-3) and (2-4), than the reference voltage on pins 2, 6, 9, 13 of the comparators, causing pins 1, 7, 8 and 14 to go high, LEDs 2, 3, 4, and 5 are off, together with LED6 connected to pin 14 of IC1-4 that is low, indicating that all five stages of modulation are off. Pin 7 of comparator (1-2) is low and LED7 connected to it is off indicating that the system is not in override ON.

As soon as the sensed temperature on the bus goes lower than the setting of the OFF potentiometer, pin 13 of comparator (1-4) has a voltage that is slightly lower than the reference voltage on pin 12 of the same comparator, pin 14 swings high, LED1 goes off and LED6 glows indicating the activation of the 1st stage of modulation. In this stage, only R26 remains in the timing resistor network. Timer IC3 provides the shortest 2 minute ON time in this modulated cycle because R30, R29, R28 and R27 are shorted by the conduction of the four Darlingtons, Q7-Q8, Q5-Q6, Q3-Q4 and Q1-Q2 respectively. Transistor Q9 receives forward bias and is ready to conduct to saturation. The output pulse from pin 3 of timer IC3 through R32 provides forward bias to transistor Q11. Q11 then conducts to saturation through Q9.

From this point on we have two circuits activated; the heater circuit and the fan circuit. In the heater circuit Q9 conducts (a) through LED9, which glows indicating that the HVAC equipment is on, and (b) through R40 to pin 2 of IC6. Input LEDs of optoisolators triac drivers IC6 and IC5 conduct activating gates of triacs TR2 and TR3, but only TR3, which is in the heater circuit, has voltage across terminals 1 and 2. For that reason the heater coil relay will be energized through pin 5 on the terminal board as described previously. Concurrently, in the fan circuit, the conduction of Q11 and Q9 closes the circuit to ground of Q12 which conducts to saturation shutting off Q13. The collector of Q13 goes high giving forward bias to Q14 through R37, D2 and R36, making it conduct to saturation. Capacitor C5 charges to approximately the regulated power supply voltage and remains in that condition for as long as Q13 is off. LED8 in collector circuit of Q14 conducts and glows indicating that the fan is on. Input LED of the optoisolator triac driver IC4 conducts and the gate of triac TR1 receives a signal and closes the circuit of the fan coil relay connected to position 8 on the terminal board as described previously.

If the sensed temperature goes down further, the voltage at point P also goes down. Pin 1 of the voltage follower (1-1) follows the signal voltage and through the mode switch SW1 applies the buffered signal to the bus. When this signal goes lower than the reference voltage from the junction of any two resistors in the voltage divider series resistance network formed by R8, R9, R10, R11 and R12, it activates sequentially comparators (2-1), (2-2), (2-3), (2-4) and (1-2). For example, when the reference voltage at the junction of R8–R9 applied to pin 2 of comparator (2-1) is higher than the dropping voltage of the bus, pin 1 of the comparator swings from high to low, applying ground to the circuit of LED2 making it glow indicating that the equipment is in the 2nd stage of modulation. Concurrently, the grounding of pin 1 shuts off the Darlington configuration of Q1–Q2, releasing the short across R27. At this moment the timing resistor goes up in value adding to R26 the value of R27 making the ON time 5 minutes, which is longer than the ON time of 2 minutes in the 1st stage of modulation.

When the voltage at the junction of R9–R10, R10–R11 and R11–R12 sequentially, become higher than the dropping voltage of the bus, the comparators (2-2), (2-3) and (2-4) swing their output pins 7, 8 and 14 from high to low respectively. As the pins reach ground potential: (a) LEDs 3, 4 and 5 glow sequentially and (b) the Darlington configurations of Q3–Q4, Q5–Q6 and Q7–Q8 shut off conduction, releasing one by one, the shorts across R28, R29 and R30. This adds the resistance of R28, R29 and R30 one by one to the timing resistor network, increasing ON time to 10, 15 and 20 minutes in the 3rd, 4th and 5th stages of modulation, respectively.

When the dropping voltage of the bus goes lower than the reference voltage on pin 5 of comparator (1-2), that is, outside of the OFF-ON voltage span, pin 7 of (1-2) swings from low to high. LED7 glows indicating that the system is in override ON. In this override condition the heater and fan will operate continuously as long as the voltage on the bus remains lower than the reference voltage on pin 5 of comparator (1-2). In terms of temperature, the system will remain ON as long as the sensed ambient temperature is lower than the ON temperature setting in the Heating mode. The signal from pin 7 of comparator (1-2) is applied also through R25 to the base of Q10 which conducts to saturation bypassing Q11. The signal applied to base of Q11 from pin 3 of the timer IC3 through R32, no longer has any effect in the output circuit because the path to ground is permanently activated for as long as Q10, in parallel with Q11, is receiving the signal from pin 7 of comparator (1-2). Capacitor C1 and resistor R20, and capacitor C2 and resistor R25 form two integrator networks to prevent false triggering of transistors Q9 and Q10 respectively.

When the system is in override ON and the sensed temperature starts to go up, the voltage increases at point P and at pin 3 of voltage follower (1-1) which buffers the signal and provides electrical isolation between the sensing and the switching circuits. Pin 1 of (1-1) applies this buffered rising voltage to the bus. At the moment the bus voltage at pin 6 of comparator (1-2) goes higher than the referenced ON voltage from the wiper arm of potentiometer R7, pin 7 of comparator (1-2) goes to ground potential, LED7 goes off indicating that the cycle is no longer in override ON. Capacitor C2 discharges to 0 volts and transistor Q10 with reverse bias on base goes off conduction. In this condition transistor Q9 remains with forward bias and is prepared to conduct. Transistors Q11 and Q9 switch either on or off according to the signals from pin 3 of IC3 which controls the switching of the output circuitry.

With the voltage on the bus located between the potentials of pin 13 of comparator (2-4) and pin 5 of comparator (1-2) the analog computer variable duty modulator is in the fifth stage. The four comparators (2-1), (2-2), (2-3) and (2-4) have their four output pins 1, 7, 8 and 14 low blocking the conduction in the four Darlington configurations of Q1–Q2, Q3–Q4, Q5–Q6 and Q7–Q8. Pin 14 of comparator (1-4) is high giving forward bias to the base of Q9. With the four Darlingtons off, the whole timing resistor network is activated putting their resistances in series for the longest ON time that the timer IC3 is capable to run out of pin 3 forward biasing switching transistor Q11.

When the rising voltage of the bus exceeds sequentially the reference voltages applied to pins 13, 9, 6 and 2 of the inverting comparators (2-4), (2-3), (2-2) and (2-1) shorting in this order the timing resistors R30, R29, R28 and R27 via the four Darlingtons Q7–Q8, Q5–Q6, Q2–Q4 and Q1–Q2, the ON time in every stage becomes shorter. At the moment that only R26 remains in the circuit, the timer IC3 provides the shortest ON time, 2 minutes. With the conditions explained above, the value of the bus voltage is between the potentials of pin 2 of comparator (2-1) and pin 12 of comparator (1-4) and the analog computer variable duty modulator is in the 1st stage.

If the sensed ambient temperature continues to rise, the voltage at point P rises and is impressed as a buffered signal to the bus. At the precise moment that the signal voltage on the bus goes higher than the reference voltage from the wiper arm of potentiometer R2 applied to Pin 12 of comparator (1-4) pin 14 of comparator (1-4) swings from high to ground potential. Ground is appled through R20 to base of OFF transistor Q9 stopping its conduction. This condition opens the circuit to the fan and heater relays and extinguishes LED9 indicating that the system is OFF. LED1 glows indicating an override OFF condition. The circuit remains in this condition for as long as the sensed temperature impresses, through its related circuitry to the bus, a voltage that is higher than all reference voltages on IC1, pins 12 and 5, and on IC2, pins 2, 6, 9 and 13. In terms of temperature, the system will remain OFF as long as the ambient temperature is higher than the OFF temperature setting.

Previous paragraphs in the Heating mode described the action of timer IC3 related to establishing five different ON times for the five stages of modulation. Additionally, the value of resistor R48 in the IC3 timer circuitry was selected to set a single OFF time of 2 minutes for each of the five stages of modulation. Resistor R48 is in parallel with D1 which shorts R48 during the ON cycle. During the OFF cycle, D1 is connected to the discharge port of IC3. D1 is reverse biased and cannot short R48 as it does in the ON cycle.

In the cooling mode the signal voltage from point P, at the junction of TH1 and R1, is applied through R4 to pin 9 of operational amplifier (1-3), which is connected in an inverting configuration with unity gain. The reference voltage on pin 10 of (1-3) comes from the junction of R5 and R6. The values of these two resistors are calculated in such a way that the voltage applied to pin 10 is exactly the same as that of point P at 75° F. ambient temperature. Switch SW1 is now in the C position. Although both operational amplifiers in the signal conditioning circuitry receive the same signal, only pin 8 of (1-3) is connected via SW1 to the bus. Through the use of the inverting configuration of (1-3) with unity gain, a positive voltage swing at point P produces a negative voltage swing at output pin 8. Conversely, for example, with a reference voltage of 7.5 Volts at an initial ambient temperature of 75° F. and a dropping temperature, that produces at point P a 1 Volt reduction, impressing through R4 to pin 9 of (1-3) a voltage of 6.5 Volts, will create a pin 8 of (1-3) a 1 Volt increase from 7.5 Volts to 8.5 Volts. In the cooling mode this means that the same change in temperature, in degrees F. either up or down from 75° F. or wherever the reference voltage is chosen will cause the bus voltage to fluctuate above or below 7.5 Volts, or the chosen reference voltage, (proportionately and exactly the same amount of volts as at point P), but in the opposite direction because of the intervention of the unity gain inverting operational amplifier (1-3).

In the cooling mode circuitry that follows, the change in sensed signal conditioning circuitry is identical in concept to that described in the heating mode, in that the OFF and the ON settings of R2 and R7 respectively, set six different reference voltages across R8 and R12. When the sensed temperature is low enough, to cause the output of the inverter (1-3) to exceed the setting of the OFF potentiometer, the voltage at point P is buffered and applied inverted to pin 8 of (1-3) and through C on SW1 to the bus. Pin 13 of comparator (1-4), connected to the bus, will be higher than pin 12 of comparator (1-4). Output pin 14 of (1-4) will be low, causing OFF LED1 to glow indicating that the system is in override OFF. Transistors Q9 and Q12 go off. Transistor Q13 conducts to saturation and Q14 shuts off: (a) Input LED8 in collector circuit of Q14, and (b) optoisolator triac driver IC4 causing gate of triac TR1, with no bias, to shut off the coil of fan relay connected to position 8 on the terminal board. Position 7 on the terminal board is connected to THG (fan in the thermostat). Concurrently, when Q9 goes off, it stops conduction of LED9 which goes off indicating that HVAC equipment is off, Input LED9, in collector circuit of Q9, shuts off optoisolators IC6 and IC5 letting gates of triacs TR2 and TR3, with no signal, shut off the coil of the external compressor relay.

Concurrently, the bus presents a higher voltage to comparators (2-1), (2-2), (2-3) and (2-4), than the reference voltage on pins 2, 6, 9 and 13 of the comparators, causing pins 1, 7, 8 and 14 to go high, LEDs, 2, 3, 4 and 5 are off, together with LED6 connected to pin 14 of comparator (1-4) that is low, indicating that all five stages of modulation are off. Pin 7 of comparator (1-2) is low and LED7 connected to it is off indicating that the system is not in override ON.

As soon as the sensed temperature on the bus increases and pin 8 of comparator (1-3) goes slightly lower than the setting of the OFF potentiometer, pin 13 of comparator (1-4) has a voltage that is slightly lower than the reference voltage on pin 12 of the same comparator, pin 14 swings high, LED1 goes off and LED6 glows indicating the activation of the 1st stage of modulation. In this stage, only R26 remains in the timing resistor network. Timer IC3 provides the shortest, 2 minute, ON time in this modulated cycle because R30, R29, R28 and R27 are shorted by the conduction of the four Darlingtons, Q7-Q8, Q5-Q6, Q3-Q4 and Q1-Q2 respectively. Transistor Q9 receives forward bias and is ready to conduct to saturation. The output pulse from pin 3 of timer IC3 through R32 provides forward bias to transistor Q11. Q11 then conducts to saturation through Q9.

From this point on two circuits are activated; the cooling circuit and the fan circuit. In the cooling circuit Q9 conducts (a) through LED9, which glows indicating that the HVAC equipment is on, and (b) through R40 to pin 2 of IC6. Input LEDs of optoisolators triac drivers IC6 and IC5 conduct activating gates of triacs TR2 and TR3, but only triac TR2, which is in the cooling compressor circuit, has voltage across terminals 1 and 2. For that reason the compressor relay will be energized through pin 5 on the terminal board. Concurrently, in the fan circuit, the conduction of Q11 and Q9 closes the circuit to ground of Q12 which conducts to saturation shutting off Q13. The collector of Q13 goes high giving forward bias to Q14 through R37, D2 and R36, making it conduct to saturation. Capacitor C5 charges to approximately the regulated power supply voltage and remains in that condition for as long as Q13 is off. LED8 in collector circuit of Q14 conducts and glows indicating that the fan is on. Input LED of optoisolator triac driver IC4 conducts and the gate of triac TR1 receives a signal and closes the circuit of the fan coil relay through position 7 on the terminal board.

While in the 1st stage of modulation in the cooling mode, if the sensed temperature continues to rise further, the voltage at point P goes up. At pin 8 of (1-3) the signal is inverted and through the mode switch SW1 applies the buffered dropping signal to the bus. When this signal goes lower than the reference voltage from the junction of any two resistors in the voltage divider series resistance network formed by R8, R9, R10, R11 and R12, it activates sequentially comparators (2-1), (2-2), (2-3), (2-4) and (2-1). For example, when the reference voltage at the junction of R8-R9 applied to pin 2 of comparator (2-1) is higher than the dropping voltage of the bus, pin 1 of the comparator swings from high to low, applying ground to the circuit of LED2 making it glow indicating that the equipment is in the 2nd stage of modulation. Concurrently, the grounding of pin 1 shuts off the Darlington configuration of Q1-Q2, releasing the short across R27. At this moment the timing resistor goes up in value by adding to R26 the value of R27. This generates an ON time of 5 minutes for the compressor which is longer than the ON time of 2 minutes in the 1st stage of modulation.

When the voltage at the junction of R9–R10, R10–R11 and R11–R12 sequentially, become higher than the dropping voltage of the bus, the comparators (2-2), (2-3) and (2-4) swing their output pins 7, 8 and 14 from high to low respectively. As the pins reach ground potential: (a) LEDs 3, 4 and 5, glow sequentially and (b) the Darlington configurations of Q3–Q4, Q5–Q6 and Q7–Q8 shut off conduction, releasing one by one the shorts across R28, R29 and R30. This adds the resistance of R28, R29 and R30 one by one to the timing resistor network, R26–R27 already activated before these actions, increasing the ON time to 10, 15 and 20 minutes in the 3rd, 4th and 5th stages of modulation, respectively. When the dropping voltage of the bus goes lower than the reference voltage on pin 5 of comparator (1-2), pin 7 of the comparator swings from low to high. LED7 glows indicating that the system is in override ON. In this override condition the compressor and fan will operate continuously as long as the voltage on the bus remains lower than the reference voltage on pin 5 of comparator (1-2). In terms of temperature, the system will remain ON as long as the sensed ambient temperature is higher than the ON temperature setting in the cooling mode. The signal from pin 7 of comparator (1-2) is applied also through R25 to base of Q10 which conducts to saturation bypassing Q11. The signal applied to base of Q11 from pin 3 of the timer IC3 through R32, no longer has any effect in the output circuit because the path to ground is permanently activated for as long as Q10, in parallel with Q11, is receiving the signal from pin 7 of (1-2). Capacitor C1 and resistor R20, and capacitor C2 and resistor R25 form two integrator networks to prevent false triggering of transistors Q9 and Q10 respectively.

When the system is in override ON and the sensed temperature starts to go down, the voltage at point P decreases and is applied to pin 9 of the unity gain inverting amplifier (1-3) which buffers the signal and provides electrical isolation between the sensing and the switching circuits. Pin 8 of (1-3) applies an inverted buffered rising voltage to the bus. At the moment that the bus voltage at pin 6 of comparator (1-2) goes higher than the reference ON voltage from the wiper arm of potentiometer R7, pin 7 of comparator (1-2) goes to ground potential, LED7 goes off indicating that the cycle is no longer in override ON. Capacitor C2 discharges to 0 Volts and transistor Q10 with reverse bias on base goes off conduction. In this condition transistor Q9 remains with forward bias and is prepared to conduct. Transistors Q11 and Q9 switch either on or off according to the signals from pin 3 of IC3, controlling the switching of the output circuitry.

With the voltage on the bus at a value between the potentials of pin 13 of comparator (2-4) and pin 5 of comparator (1-2), the analog computer variable duty modulator is in the 5th stage. The four comparators (2-1), (2-2), (2-3) and (2-4) have their four output pins 1, 7, 8 and 14 low blocking the conduction in the four Darlington configurations of Q1–Q2, Q3–Q4, Q5–Q6, Q7–Q8. Pin 14 of (1-4) is high giving forward bias to the base of Q9. With the four Darlingtons off, the whole timing resistor network is activated putting their resistances in series for the longest ON time, 20 minutes, that the timer IC3 is capable to run out of pin 3 forward biasing switching transistor Q11.

When the rising voltage of the bus exceeds sequentially the reference voltages applied to pins 13, 9, 6 and 2 of the inverting comparators (2-4), (2-3), (2-2) and (2-1) shorting in this order the timing resistors R30, R29, R28 and R27 via the four Darlingtons Q7–Q8, Q5–Q6, Q3–Q4 and Q1–Q2, the ON time in every stage becomes shorter. At the moment that only R26 remains in the circuit the timer IC3 provides the shortest ON time, 2 minutes. With the conditions explained above, the value of the bus voltage is between the potentials of pins 2 of comparator (2-1) and pin 12 of comparator (1-4) and the analog computer variable duty modulator is in the 1st stage.

If the sensed ambient temperature continues to lower, the bus voltage for the circuitry explained above will rise. At the precise moment that this bus voltage goes higher than the reference voltage from the wiper arm of potentiometer R2 applied to pin 12 of comparator (1-4), pin 14 of comparator (1-4) swings from high ground potential. Ground is applied through R20 to base of OFF transistor Q9 stopping its conduction. This condition opens the circuit to the fan and compressor relays and extinguishes LED9 indicating that the system is in override OFF. The circuit remains in this condition for as long as the sensed temperature impresses, through its related circuitry to the bus, a voltage that is higher than all reference voltages on IC1, pins 12 and 5; and on IC2, pins 2, 6, 9 and 13. In terms of temperature, the system will remain off as long as the ambient temperature is lower than the OFF temperature setting.

Previous paragraphs in the cooling mode described the action of timer IC3 related to establishing five different ON times for the five stages of modulation. Additionally, the value of resistor R31 in the IC3 timer circuitry was selected to set a single OFF time of 5 minutes for each of the five stages of modulation for compressors rated up to 5 tons of refrigeration. R31 is in series with the parallel combination of R47 and jumper J1. This feature of the timing circuit provides the capability to extend the OFF time to 7 minutes in the preferred embodiment for units that have a capacity of more than 7 tons of refrigeration that require a larger OFF time than units of 5 tons or less. The only requirement for conversion is removing jumper J1 at the time of installation.

The auxiliary output, (AUX) as shown on FIG. 1, in the preferred embodiment is an output that provides a pair of dry contacts that can control a second air conditioning unit, a water heater, or any other device that can be cycled. The OFF time is fixed at 5 minutes and is controlled by the value of R43. Diode, D3, is in parallel with resistor R43 during the on Cycle. The on time is manually controlled by the variable resistor R45. The minimum on time of 5 minutes is obtained with zero resistance on R45 and the value of R44 alone. The maximum on time of 15 minutes is obtained with the combination of R44 plus the maximum resistance of R45. C6 is the timing capacitor. IC7 is the timer itself and its output pin 3 is connected through resistor R50 and LED10 to the coil of relay K1. When pin 3 of IC7 is high, LED10 glows and the coil of K1 energizes, closing the normally open dry contacts activating the exterior circuit through positions 11 and 12 on the terminal board. Diode D8 is connected with reverse bias in parallel to the coil of K1 in order to protect LED10 and the internal circuitry of IC7 from the reverse peak voltages that can be generated at the switching of K1. The setting of the auxiliary output must be done by a technician at the time of installation since an evaluation must be made of the requirements of the device to be cycled.

In FIG. 1 the four pole, double throw switch SW1 has three functions as a mode switch for heating and cooling operation. Function one is in the sensed temperature signal conditioning circuit. Function two is in the timer and overdrive circuits. Function three allows the analog computer variable duty modulator to be installed to a heat pump unit without any modification of the external circuitry. When switch SW1 is in the heating mode, one section of the switch closes the circuit to the compressor relay keeping it running and the heat strips of the heater are variable duty modulated, because they are connected to the heater output of the analog computer variable duty modulator. Section 4 of SW1 is not used.

In FIG. 1, switch SW3 is the Manual-Auto switch. This switch gives to the analog computer variable duty modulator the possibility, in the event of a malfunction of the electronic circuitry, to return control to the existing thermostat. SW3 in the manual position, physically shorts the input from the thermostat to the output relay of the heater or compressor and fan from terminal board position 5 to 6, 3 to 4 and 7 to 8 respectively.

In FIG. 1 switch SW2 is the Auto-On fan switch. When switches SW2 and SW3 are in the Auto position, and the analog computer variable duty modulator is in one of the stages of modulation from the 1st to the 5th, and at the end of the ON time, either the compressor or the heater goes off, depending on the position of the mode switch SW1, the fan relay will continue to be energized for the period of time that is determined by the fan control circuitry. If switch SW2 is thrown to the ON position it will place a physical short across positions 7 and 8 on the terminal board which are the input from the thermostat and the output to the fan relay. The fan will run continuously ignoring the signals to stop that will be coming from the fan control circuitry.

In FIG. 2 SW1 is a four pole, double throw switch. Thermistor TH1 is connected in series with resistor R1 and this junction forms that point P. One of the ends of this series configuration is connected to one of the common terminals of SW1 and the other end to the other common terminal of SW1, the other two terminals of SW1, which correspond to the common terminal where TH1 is connected, are connected to the positive side of the regulated power supply and to ground, respectively. The other two terminals of SW1 which correspond to the common terminal where R1 is connected are connected to the positive side of the regulated power supply and to ground, respectively. But connected in an opposite fashion, in such a way that when the mode switch SW1 is thrown to the heating mode, TH1 is connected to the positive side of the regulated power supply and R1 to ground. When switch SW1 is thrown to the cooling mode, TH1 is connected to ground and R1 to the positive side of the regulated power supply. The value of R1 is chosen in such a way that when the ambient temperature is 75° F., the point P is at the same voltage as the wiper arm of R2 and R7 when they are set to 75° F. OFF or ON respectively. Point P is connected to pin 3 of operational amplifier (1-1) which is connected in a voltage follower configuration; its output pin 1 is connected to the bus. In this case the inversion of the changes in voltage when the mode switch goes from heating to cooling or vice versa is obtained automatically by the switch itself connecting alternatively the series configuration to positive and ground or to ground and positive, respectively.

In FIG. 3, optoisolator triac driver IC4 and triac TR1 with their respective network of bias in the preferred embodiment are replaced by an electromechanical relay.

In FIG. 4, IC5 IC6, TR2 and TR3 and their respective network of bias in the preferred embodiment are replaced by two single pole, single or double throw electromechanical relays.

In FIG. 5, IC5 IC6, TR2 and TR3 and their respective network of bias in the preferred embodiment are replaced by one double pole, single or double throw electromechanical relay.

The foregoing descriptions of the preferred embodiments of the invention are presented in sufficient detail as will enable one skilled in the art to make and use electronic circuits according to the invention without undue experimentation. However, it is not intended to restrict or limit the invention to those details inasmuch as other elements may be substituted and improvements or modifications may be made to the embodiments depicted and described. Also such improvements, modifications and variations are contemplated within the scope of the invention and become readily apparent in view of the present specification. Accordingly, the invention should not be construed as limited to the specific embodiments depicted and described herein, but rather should be broadly construed within the full spirit and scope of the claims appended hereto.

I claim:

1. An environmental temperature control system for air conditioning and heating equipment having a heating and a cooling mode, including a fan for blowing air through the equipment, a refrigeration system including a compressor and a heating system including heating means comprising a temperature sensing means for sensing temperature in a controlled space to be conditioned, signal conditioner means coupled to said temperature sensing means to buffer the signal and to provide at least two outputs, a first of said outputs being proportional to the temperature difference between the said sensed temperature and a set-point temperature of the controlled space, and a second of said outputs indicating a sensed temperature outside of a range of comfort zone temperatures, variable ON timer means for providing different ON times to said air conditioning and heating equipment responsive to said first output, said variable ON timer means also including a predetermined FIXED OFF time for said cooling mode and a different predetermined FIXED OFF time for said heating mode, a timer override means responsive to a second of said outputs of said signal conditioner means for overriding the variable timer means when said sensed temperature is outside of said comfort zone temperatures and causing the said air conditioning or heating equipment to operate continuously, fan delay timer means for operating the fan beyond the ON time, and heating, cooling and fan relay control means coupled to said signal conditioner means and override means for providing output signals to respectively control heating means, the compressor and the fan.

2. An environmental temperature control system for air conditioning and heating equipment having a heating and a cooling mode, including a fan for blowing air through the equipment, a refrigeration system including a compressor and a heating system including heating means comprising a temperature sensing means for sensing temperature in a controlled spaced to be conditioned, signal conditioner means coupled to said temperature sensing means to buffer the signal and to provide at least two outputs, a first of said outputs being proportional to the temperature difference between the said sensed temperature and a set-point temperature of the controlled space, and a second of said outputs indicating a sensed temperature outside of a range of comfort zone temperatures, variable ON timer means for providing different ON times to said air conditioning and heating equipment responsive to said first output, said variable ON timer means also including a predetermined FIXED OFF time for said cooling mode and a different predetermined FIXED OFF time for said heating mode, a timer override means responsive to a second of said outputs of said signal conditioner means for overriding the variable timer means when said sensed temperature is outside of said comfort zone temperatures and causing the said air conditioning or heating equipment to operate continuously, fan delay timer means for operating the fan beyond the ON time, and heating, cooling and fan relay control means coupled to said signals conditioner means and override means for providing output signals to respectively control heating means, the compressor and the fan, and a network of comparators coupled to said signal conditioner means in order to divide the comfort zone into a plurality of portions of equal amounts of degrees.

3. The system of claim 2 wherein the network of comparators compare the sensed temperature against the high and low temperatures that form the comfort zone, and including manually operable comfort zone setting means to provide a high and a low reference voltage to be divided into said plurality of portions of equal amounts of degrees.

4. The system of claim 3 wherein the variable ON timer means comprises a switching network formed by a plurality of transistors connected in pairs in a darlington configuration.

5. The system of claim 4 wherein there is provided removable jumper means in order to extend the FIXED OFF time in the cooling mode.

* * * * *